United States Patent
Lee et al.

(10) Patent No.: US 8,605,308 B2
(45) Date of Patent: Dec. 10, 2013

(54) APPARATUS FOR DISPLAYING SLIDE SHOW FUNCTION AND METHOD OF CONTROLLING THE SAME

(75) Inventors: Hyung Il Lee, Gumi-si (KR); Jeong Sim Kim, Gumi-si (KR)

(73) Assignee: LG Electronics Inc., Seoul (KR)

( * ) Notice: Subject to any disclaimer, the term of this patent is extended or adjusted under 35 U.S.C. 154(b) by 1152 days.

(21) Appl. No.: 12/439,316

(22) PCT Filed: Jun. 20, 2007

(86) PCT No.: PCT/KR2007/002984
§ 371 (c)(1),
(2), (4) Date: Jul. 15, 2009

(87) PCT Pub. No.: WO2008/026821
PCT Pub. Date: Mar. 6, 2008

(65) Prior Publication Data
US 2009/0290194 A1  Nov. 26, 2009

(30) Foreign Application Priority Data
Sep. 1, 2006  (KR) ........................ 10-2006-0084097

(51) Int. Cl.
*H04N 5/76* (2006.01)
*G06F 3/12* (2006.01)
*G03B 23/00* (2006.01)
*G06F 3/13* (2006.01)

(52) U.S. Cl.
CPC . *G03B 23/00* (2013.01); *G06F 3/13* (2013.01)
USPC ...................................... 358/1.15; 348/231.5

(58) Field of Classification Search
USPC .......... 707/530; 345/168; 358/1.15; 715/810, 715/771, 779; 710/105
See application file for complete search history.

(56) References Cited

U.S. PATENT DOCUMENTS

| 6,008,807 | A | 12/1999 | Bretschneider et al. ...... 345/339 |
| 6,408,301 | B1 | 6/2002 | Patton et al. |
| 7,657,096 | B2 * | 2/2010 | Hosoda et al. ................. 382/190 |
| 8,078,618 | B2 * | 12/2011 | VanEpps et al. .............. 707/736 |

(Continued)

FOREIGN PATENT DOCUMENTS

| JP | 407262198 | * 10/1995 | .............. G06F 17/30 |
| JP | 2001-228528 | 8/2001 | |

(Continued)

OTHER PUBLICATIONS

Hua, Xian-Sheng, et al.: "Content Based Photograph Slide Show with Incidental Music"; ISCAS '03, vol. 2, pp. II 648-II 651; May 25-28, 2003.

(Continued)

*Primary Examiner* — Jerome Grant, II
(74) *Attorney, Agent, or Firm* — KED & Associates, LLP (57) ABSTRACT

An apparatus for displaying a slide show function and method of controlling the same are disclosed, by which a still image file of a user specific group can be outputted in the course of performing a slide show function and by which a plurality of still image files can be automatically sorted and stored. The present invention includes reading additional information for at least ne or more still image fields to which the slide show function is applied, grouping the at least one or more still image files into at least two groups using the read additional information, and if a prescribed key input is received in the course of executing the slide show function, displaying the still image files of the group different from the group to which the currently displayed still image file belongs.

7 Claims, 8 Drawing Sheets

(56) References Cited

U.S. PATENT DOCUMENTS

| | | |
|---|---|---|
| 2001/0013046 A1* | 8/2001 | Katayama et al. ............ 707/530 |
| 2001/0022621 A1 | 9/2001 | Squibbs |
| 2004/0169742 A1* | 9/2004 | Shibutani et al. .......... 348/231.5 |
| 2004/0217884 A1 | 11/2004 | Samadani et al. |
| 2004/0218894 A1 | 11/2004 | Harville et al. |
| 2007/0157104 A1* | 7/2007 | Blain et al. .................... 715/771 |
| 2008/0069540 A1* | 3/2008 | Takagi et al. ................. 386/117 |
| 2009/0228833 A1* | 9/2009 | Nakayama ................... 715/810 |

FOREIGN PATENT DOCUMENTS

| | | | |
|---|---|---|---|
| JP | 2005-033711 | | 2/2005 |
| JP | 2006-146755 A | | 6/2006 |
| JP | 2009245041 | * | 10/2009 |

OTHER PUBLICATIONS

PCT International Search Report and Written Opinion dated Apr. 7, 2009 for Application No. PCT/KR2007/002984.

* cited by examiner

| Tag Name | Field Name | Tag ID Dec | Tag ID Hex | Type | Count |
|---|---|---|---|---|---|
| A. Tags relating to image data structure | | | | | |
| Image width | ImageWidth | 256 | 100 | SHORT or LONG | 1 |
| Image height | ImageLength | 257 | 101 | SHORT or LONG | 1 |
| Number of bits per component | BitsPerSample | 258 | 102 | SHORT | 3 |
| Compression scheme | Compression | 259 | 103 | SHORT | 1 |
| Pixel composition | PhotometricInterpretation | 262 | 106 | SHORT | 1 |
| Orientation of image | Orientation | 274 | 112 | SHORT | 1 |
| Number of image | SamplesPerPixel | 277 | 115 | SHORT | 1 |
| Image data arrangement | PlanarConfiguration | 284 | 11C | SHORT | 1 |
| Subsampling ratio of Y to C | YCbCrSubSampling | 530 | 212 | SHORT | 2 |
| Y and C positioning | YCbCrPositioning | 531 | 213 | SHORT | 1 |
| Image resolution in width direction | XResolution | 282 | 11A | RATIONAL | 1 |
| Image resolution in height direction | YResolution | 283 | 11B | RATIONAL | 1 |
| Unit of X and Y resolution | ResolutionUnit | 296 | 128 | SHORT | 1 |
| B. Tags relating to recording offset | | | | | |
| Image data location | StripOffsets | 273 | 111 | SHORT or LONG | *S |
| Number of rows per strip | RowsPerStrip | 278 | 116 | SHORT or LONG | 1 |
| Bytes per compressed strip | StripByteCounts | 279 | 117 | SHORT or LONG | *S |
| Offset to JPEG SOI | JPEGInterchangeFormat | 513 | 201 | LONG | 1 |
| Bytes of JPEG data | JPEGInterchangeFormatLength | 514 | 202 | LONG | 1 |
| C. Tags relating to image data characteristics | | | | | |
| Transfer function | TransferFunction | 301 | 12D | SHORT | 3*256 |
| White point chromaticity | WhitePoint | 318 | 13E | RATIONAL | 2 |
| Chromaticities of primaticity | PrimaryChromaticities | 319 | 13F | RATIONAL | 6 |
| Color space transformation matrix coefficients | YCbCrCoefficients | 529 | 211 | RATIONAL | 3 |
| Pair of black and white reference values | ReferenceBlackWhite | 532 | 214 | RATIONAL | 6 |
| D. Other tags | | | | | |
| File change date and time | DataTime | 306 | 132 | ASCII | 20 |
| Imge title | ImgeDescription | 270 | 10E | ASCII | Any |
| Image input equipment manufacturer | Make | 271 | 10F | ASCII | Any |
| Image input equipment model | Model | 272 | 110 | ASCII | Any |
| Software used | Software | 305 | 131 | ASCII | Any |
| Person who created the image | Artist | 315 | 13B | ASCII | Any |
| Copyright holder | Copyright | 33432 | 8298 | ASCII | Any |

Fig. 4

| G. Tags relating to picture-taking conditions | | | | | |
|---|---|---|---|---|---|
| Exposure time | ExposureTime | 33434 | 829A | RATIONAL | 1 |
| F number | FNumber | 33437 | 829D | RATIONAL | 1 |
| Exposure program | ExposureProgram | 34850 | 8822 | SHORT | 1 |
| Spectral sensitivity | SpectralSensitivity | 34852 | 8824 | ASCII | Any |
| ISO speed rating | ISOSpeedRatings | 34855 | 8827 | SHORT | Any |
| Optoelectric conversion factor | OECF | 34856 | 8828 | UNDEFINED | Any |
| Shutter speed | ShutterSpeedValue | 37377 | 9201 | SRATIONAL | 1 |
| Aperture | ApertureValue | 37378 | 9202 | RATIONAL | 1 |
| Brightness | BrightnessValue | 37379 | 9203 | SRATIONAL | 1 |
| Exposure bias | ExposureBiasValue | 37380 | 9204 | SRATIONAL | 1 |
| Maximum lens aperture | MaxApertureValue | 37381 | 9205 | RATIONAL | 1 |
| Subject distance | SubjectDistance | 37382 | 9206 | RATIONAL | 1 |
| Metering mode | MeteringMode | 37383 | 9207 | SHORT | 1 |
| Light source | LightSource | 37384 | 9208 | SHORT | 1 |
| Flash | Flash | 37385 | 9209 | SHORT | 1 |
| Lens focal length | FocalLength | 37386 | 920A | RATIONAL | 1 |
| Subject area | SubjectArea | 37386 | 9214 | SHORT | 2or3or4 |
| Flash energy | FlashEnergy | 41483 | A20B | RATIONAL | 1 |
| Spatial frequency response | SpatialFrequencyResponse | 41484 | A20C | UNDEFINED | Any |
| Focal plane X resolution | FocalPlaneXResolution | 41486 | A20E | RATIONAL | 1 |
| Focal plane Y resolution | FocalPlaneYResolution | 41487 | A20F | RATIONAL | 1 |
| Focal plane resolution unit | FocalPlaneResolutionUnit | 41488 | A210 | SHORT | 1 |
| Subject location | SubjectLocation | 41492 | A214 | SHORT | 2 |
| Exposure index | ExposureIndex | 41493 | A215 | RATIONAL | 1 |
| Sensing method | SensingMethod | 41495 | A217 | SHORT | 1 |
| File source | FileSource | 41728 | A300 | UNDEFINED | 1 |
| Scene type | SceneType | 41729 | A301 | UNDEFINED | 1 |
| CFA pattern | CFAPattern | 41730 | A302 | UNDEFINED | Any |
| Custom image processing | CustomRendered | 41985 | A401 | SHORT | 1 |
| Exposure mode | ExposureMode | 41986 | A402 | SHORT | 1 |
| White balance | WhiteBalance | 41987 | A403 | SHORT | 1 |
| Digital zoom ratio | DigitalZoomRatio | 41988 | A404 | RATIONAL | 1 |
| Focal length in 35mm film | FocalLengthIn35mmFilm | 41989 | A405 | SHORT | 1 |
| Scene capture type | SceneCaptureType | 41990 | A406 | SHORT | 1 |
| Gain control | GainControl | 41991 | A407 | RATIONAL | 1 |
| Contrast | Contrast | 41992 | A408 | SHORT | 1 |
| Saturation | Saturation | 41993 | A409 | SHORT | 1 |
| Sharpness | Sharpness | 41994 | A40A | SHORT | 1 |
| Device settings description | DeviceSettingsDescription | 41995 | A40B | UNDEFINED | Any |
| Subject distance range | SubjectDistanceRange | 41996 | A40C | SHORT | 1 |

Fig. 5

| Tag Name | Field Name | Tag ID Dec | Tag ID Hex | Type | Count |
|---|---|---|---|---|---|
| A. Tags Relating to GPS | | | | | |
| GPS tag version | GPSVersionID | 0 | 0 | BYTE | 4 |
| North or South Latitude | GPSLatitudeRef | 1 | 1 | ASCII | 2 |
| Latitude | GPSLatitude | 2 | 2 | RATIONAL | 3 |
| East of West Longitude | GPSLongitudeRef | 3 | 3 | ASCII | 2 |
| Longitude | GPSLongitude | 4 | 4 | RATIONAL | 3 |
| Altitude reference | GPSAltitudeRef | 5 | 5 | BYTE | 1 |
| Altitude | GPSAltitude | 6 | 6 | RATIONAL | 1 |
| GPS time (atomic clock) | GPSTimeStamp | 7 | 7 | RATIONAL | 3 |
| GPS satellites used for measurement | GPSSatellites | 8 | 8 | ASCII | Any |
| GPS receiver status | GPSStatus | 9 | 9 | ASCII | 2 |
| GPS measurement mode | GPSMeasureMode | 10 | A | ASCII | 2 |
| Measurement precision | GPSDOP | 11 | B | RATIONAL | 1 |
| Speed unit | GPSSpeedRef | 12 | C | ASCII | 2 |
| Speed of GPS receiver | GPSSpeed | 13 | D | RATIONAL | 1 |
| Reference for direction of movement | GPSTrackRef | 14 | E | ASCII | 2 |
| Direction of movement | GPSTrack | 15 | F | RATIONAL | 1 |
| Reference for direction of image | GPSImgDirectionRef | 16 | 10 | ASCII | 2 |
| Direction of image | GPSImgDirection | 17 | 11 | RATIONAL | 1 |
| Geodetic survey data used | GPSMapDatum | 18 | 12 | ASCII | Any |
| Reference for latitude of destination | GPSDestLatitudeRef | 19 | 13 | ASCII | 2 |
| Latitude of destination | GPSDestLatitude | 20 | 14 | RATIONAL | 3 |
| Reference for longitude of destination | GPSDestLongitudeRef | 21 | 15 | ASCII | 2 |
| Longitude of destination | GPSDestLongitude | 22 | 16 | RATIONAL | 3 |
| Reference for bearing of destination | GPSDestBearingRef | 23 | 17 | ASCII | 2 |
| Bearing of destination | GPSDestBearing | 24 | 18 | RATIONAL | 1 |
| Reference for distance to destination | GPSDestDistanceRef | 25 | 19 | ASCII | 2 |
| Distance to destination | GPSDestDistance | 26 | 1A | RATIONAL | 1 |
| Name of GPS processing method | GPSProcessingMethod | 27 | 1B | UNDEFINED | Any |
| Name of GPS area | GPSAreaInformation | 28 | 1C | UNDEFINED | Any |
| GPS date | GPSDateStamp | 29 | 1D | ASCII | 11 |
| GPS differential correction | GPSDifferential | 30 | 1E | SHORT | 1 |

APPARATUS FOR DISPLAYING SLIDE SHOW FUNCTION AND METHOD OF CONTROLLING THE SAME

TECHNICAL FIELD

The present invention relates to a display apparatus and controlling method thereof, and more particularly, to an apparatus for displaying a slide show function and method of controlling the same. Although the present invention is suitable for a wide scope of applications, it is particularly suitable for storing still image files sorted into groups using additional information for the still image files and outputting the still image file included in each of the groups selectively according to a user' selection input.

BACKGROUND ART

Generally, a display device such as a television (TV), a digital television (DTV), a personal computer (PC), and the like is provided with various functions owing to the rapid technical developments. In particular, in case that at least two still image files captured by a digital camera or the like are stored, the demand for a display device capable of displaying the still image files sequentially tends to rise. In this case, the function of displaying the still image files sequentially can be named a slide show function or more.

DISCLOSURE OF INVENTION

Technical Problem

In case of using the slide show function, a user is able to check many still images filed one by one.

Technical Solution

Accordingly, the present invention is directed to an apparatus for displaying a slide show function and method of controlling the same that substantially obviate one or more problems due to limitations and disadvantages of the related art.

An object of the present invention is to provide an apparatus for displaying a slide show function and method of controlling the same, by which a still image file of a user-specific group can be outputted in the course of performing a slide show function.

Another object of the present invention is to provide an apparatus for displaying a slide show function and method of controlling the same, by which a plurality of still image files can be automatically sorted and stored.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a slide show function in a display device according to the present invention includes the steps of reading additional information for at least one or more still image files to which the slide show function is applied, grouping the at least one or more still image files into at least two groups using the read additional information, and if a prescribed key input is received in the course of executing the slide show function, displaying the still image files of the group different from the group to which the currently displayed still image file belongs.

Preferably, the at least one or more still image files include at least one or more JPEG (joint photographic expert group) files.

More preferably, the additional information includes EXIF (exchangeable image file format) information.

Preferably, the grouping step includes the step of grouping the at least one or more still image files with reference to date information.

Preferably, the grouping step includes the step of grouping the at least one or more still image files with reference to GPS (global positioning system) information.

Preferably, the method further includes the steps of sorting the at least two groups and storing the sorted at least two groups in a prescribed storage means.

Preferably, the method further includes the step of receiving reference additional information as a reference of the grouping from a user. In this case, the additional information reading step includes the step of reading the additional information for the still image files corresponding to the reference additional information.

In another aspect of the present invention, a display apparatus having a slide show function includes a reading unit reading additional information for at least one or more still image files to which the slide show function is applied, a selecting unit grouping the at least one or more still image files into at least two groups using the read additional information for the at least one or more still image files, and a control unit controlling to display the still image files of the group different from the group to which the currently displayed still image file belongs if a prescribed key input is received in the course of executing the slide show function.

Preferably, the at least one or more still image files include at least one or more JPEG (joint photographic expert group) files.

Preferably, the additional information includes EXIF (exchangeable image file format) information.

Preferably, the selecting unit groups the at least one or more still image files into the at least two groups with reference to date information.

Preferably, the display apparatus is either a television or a personal computer.

It is to be understood that both the foregoing general description and the following detailed description of the present invention are exemplary and explanatory and are intended to provide further explanation of the invention as claimed.

Advantageous Effects

Accordingly, the present invention provides the following effects or advantages.

First of all, a specific still image file of a group different from a former group to which a currently outputted still image picture belongs can be outputted in a simple way without searching for specific user-specific still image files one by one in the course of using a slide function.

Secondly, since still image files are automatically grouped and stored according to a specific reference, user' convenience and facilitation can be enhanced.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is an exemplary diagram of a data structure of image information in EXIF (exchangeable image file format) information;

FIG. 4 is an exemplary diagram of a data structure of photographing information in EXIF information;

FIG. 5 is an exemplary diagram of a data structure of GPS information in EXIF information;

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
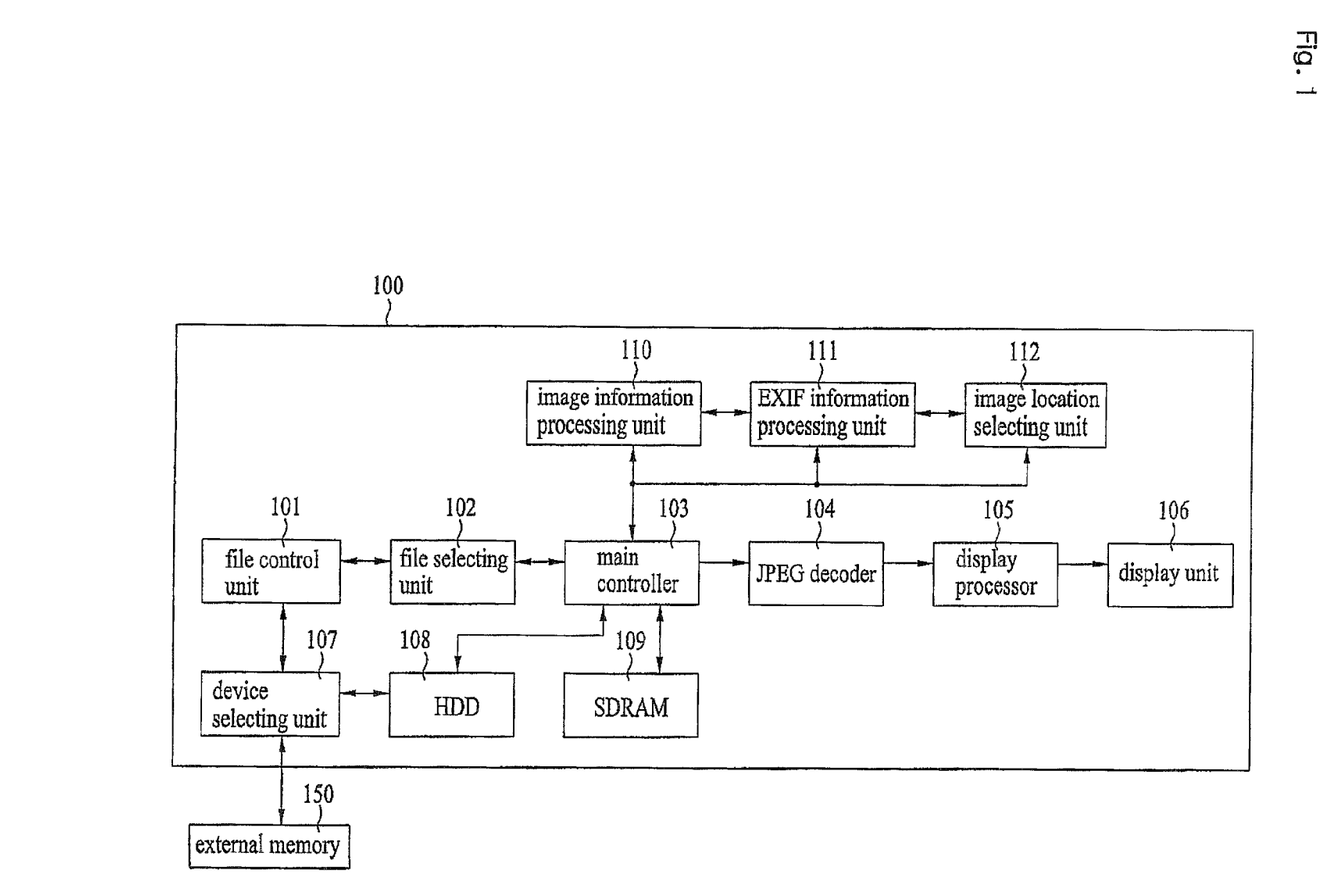
FIG. 1 is a block diagram of an apparatus for displaying a slide show jump function according to the present invention.

FIG. 1 is a block diagram of an apparatus for displaying a slide show jump function according to the present invention.

Referring to FIG. 1, an apparatus 100 for displaying a slide show jump function according to the present invention includes a file control unit 101, a file selecting unit 102, a main controller 103, a JPEG decoder 104, a display processor 105, a display unit 106, a device selecting unit 107, an HDD 108, an SDRAM 109, an image information processing unit 110, an EXIF information processing unit 111, and an image location selecting unit 112. The display apparatus 100 includes a TV (television), a PC (personal computer), a mobile phone, or the like and is capable of performing a slide show function.

If a command signal for executing a slide show is inputted via a user input unit (user interface, not shown in the drawing) or the like, the device selecting unit 107 selects the HDD (hard disc drive) 108 or an external memory 150 under the control of the main controller 103.

Meanwhile, the main controller 103 plays a role in controlling the respective elements of the display apparatus 100 overall and includes a CPU (central processing unit), a microcomputer, or the like.

And, the external memory 150 includes a USB (universal serial bus) memory, a memory card, or the like.

According to user selection input, if the device selecting unit 107 selects the HDD 108 or the external memory 150 as a device in which still image files are stored to execute the slide show, the file selecting unit 102 sequentially selects the still image files previously stored in the HDD 108 or the external memory 150 one by one under the control of the file control unit 101.

The JPEG decoder 104 plays a role in decoding the still image file selected by the file selecting unit 102. In the present disclosure, the still image file includes a JPEG file for example. It is apparent to those skilled in the art that the present invention is applicable to still image files in different formats.

The display processor 105 performs signal processing on the still image file decoded by the JPEG decoder into a signal in a format outputable via the display unit 106.

And, the display unit 106 outputs the still image file signal-processed by the display processor 105.

A process for the display apparatus shown in FIG. 1 to implement the slide show jump function according to an embodiment of the present invention is explained in detail as follows.

First of all, the image information processing unit 110 interprets additional information for slide show targeted still image files under the control of the main controller 103.

Figure 2:
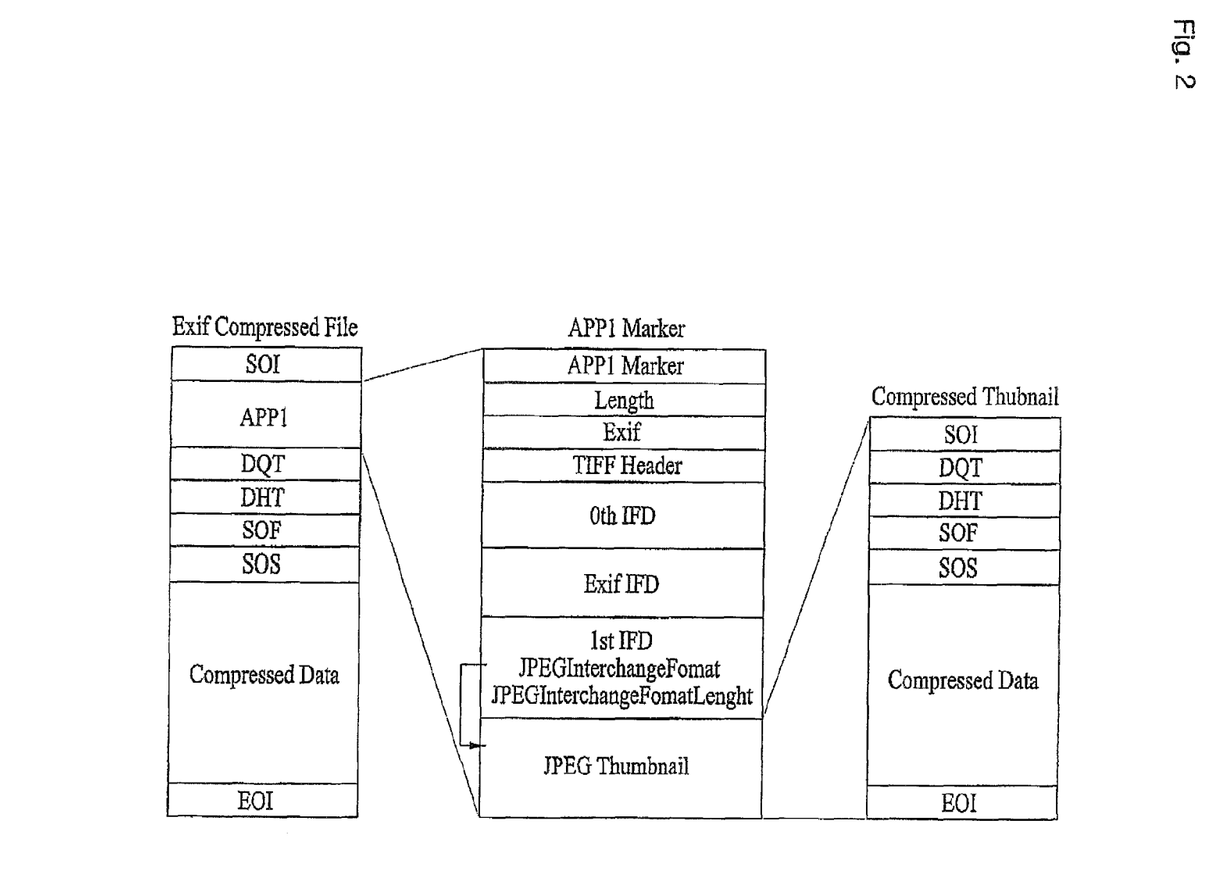
FIG. 2 is an exemplary diagram of a data structure of a JPEG (joint photographic expert group) still image file.

FIG. 2 is an exemplary diagram of a data structure of a JPEG (joint photographic expert group) still image file. For instance, if a still image file is a JPEG file photographed by a digital camera or the like, the still image file can have the data structure shown in FIG. 2.

The image processing unit 110 decides a file name, a presence or non-presence of EXIF information, and the like by interpreting the data structure of the still image file shown in FIG. 2 or the like. If the EXIF information exists, the EXIF information processing unit 111 reads additional information such as image information, photographing information, GPS information, and the like in the EXIF info nation of the still image file.

For reference, in the EXIF information, a data structure of the image information is shown in FIG. 3, a data structure of the photographing information is shown in FIG. 4, and a data structure of the GPS information is shown in FIG. 5.

In particular, the image information processing unit 110 is able to confirm the additional information such as a photographing time (DateTime) of a still image file (e.g., JPEG file), camera information (Model), flash, exposure time, shutter speed, GPS latitude, GPS longitude, and the like using the EXIF information shown in FIGS. 3 to 5.

In this case, the image location selecting unit 112 groups the still image files according to a prescribed reference using the additional information.

An example of the grouping using the photographing time (DateTime) and the GPS information is explained as follows.

First of all, the display apparatus shown in FIG. 1 is able to sort the still image files, to which a slide show is applied, by photographing time (DateTime). For instance, the display apparatus can group the still image files by a unit of the same year, the same month, the same week, the same date, or the like.

Optionally, the display apparatus is able to group the still image files by a unit of a.m. or p.m.

Moreover, the display apparatus can bind the still image files photographed within a predetermined time into the same group based on the information for the photographing time (DateTime).

Meanwhile, the display apparatus is able to sort the still image files, to which a slide show is applied, based on GPS information. For instance, the display apparatus can group the still image pictures, if a longitude of a photographing area of a specific still image file lies between +10~−10, into the same group.

Furthermore, the display apparatus is able to group the still image files into Seoul group, Tokyo Group, Paris group, and the like by matching GIS (geographical information system) information to GPS information of another map information system.

Thus, in the environment that the still image files are grouped to execute the slide show, if a user selects to input a jump key button via the user interface (not shown in the drawings) or the like, the slide show is executed in a manner of selecting a still image file belongs to a group different from another group, to which a currently displayed still image file belongs, among the groups grouped by the image location selecting unit 112. In this case, there can exist at least two groups different from the group to which the still image file belongs. And, they can be displayed in a prescribed order whenever a user inputs the 'JUMP' key button.

The 'JUMP' key button of the user interface (not shown in the drawings) can be added as a separate button to a remote controller or the like. Alternatively, a general button is used as the 'JUMP' key button.

Whether to select a prescribed still image file from a plurality of still image files of a group to which a currently displayed still image file does not belong can be decided by a random or in order of a great or small reference value size.

In case that a user attempts to view a still image file photographed at a different time or area (i.e., a still image file belonging to a different group) using a slide show function while viewing a previously photographed still image file, a 'JUMP' key button of the video apparatus shown in FIG. 1 is simply pressed. Hence, user' convenience and satisfaction for product can be considerably enhanced.

Figure 6:
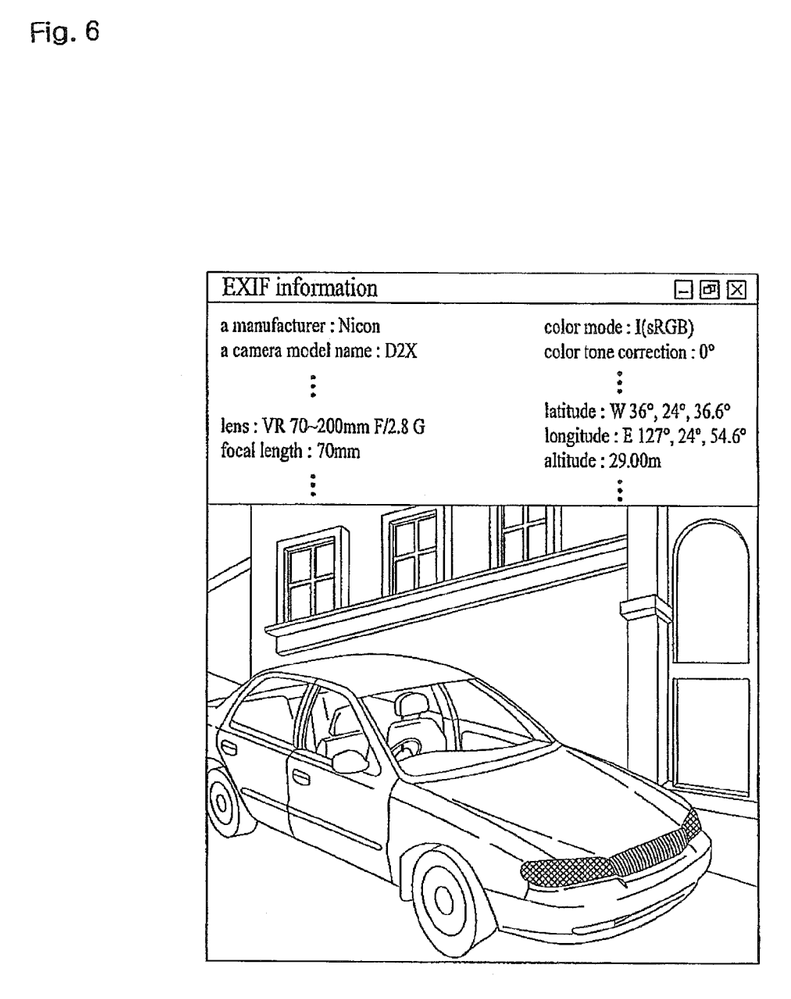
FIG. 6 is a diagram of an example for displaying EXIF information on a screen.

FIG. 6 is a diagram of an example for displaying EXIF information on a screen.

An example of displaying EXIF information on a screen is explained with reference to FIG. 6 as follows.

First of all, a user is able to directly confirm EXIF information for a still image file (e.g., JPEG file). If a user selects an EXIF information view using an EXIF information viewing program or the like, a manufacturer, a camera model name, photographing information (lens, focal length, etc.), picture information (color mode, color tone correction, etc.), GPS information (latitude, longitude, altitude, etc.), and the like appear on an upper end of a photographed picture shown in FIG. 6.

Optionally, EXIF information can be automatically defined in a JPEG file in advance or a user can directly input additional information (time information, GPS information, etc.) for a random still image file.

Figure 7:
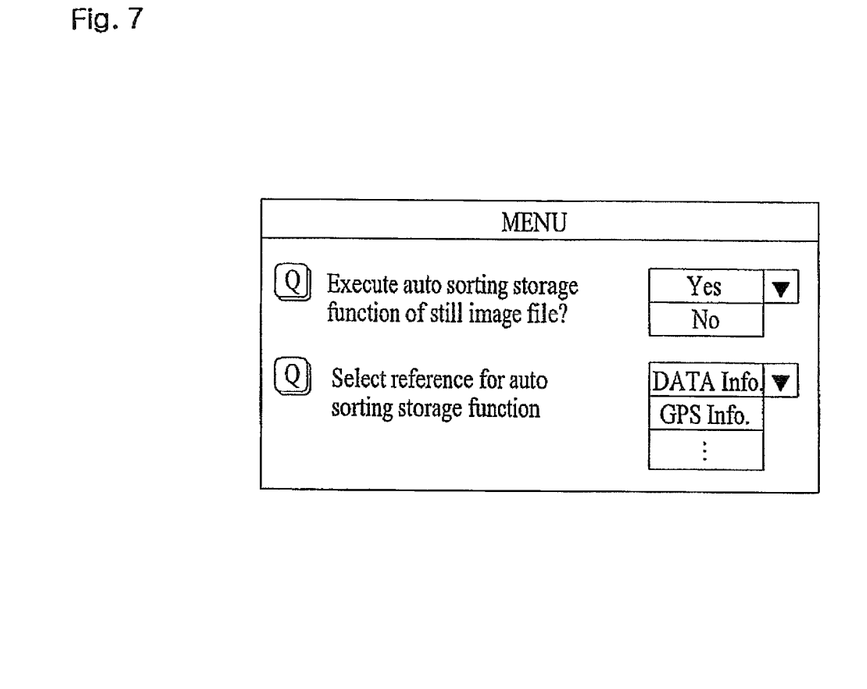
FIG. 7 is an exemplary diagram of a picture for setting an automatic sorting storage function.

FIG. 7 is an exemplary diagram of a picture for setting an automatic sorting storage function.

Figure 8:
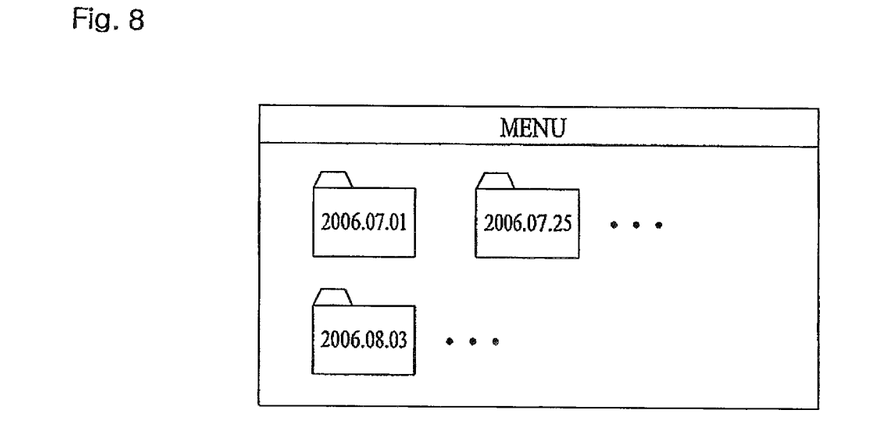
FIG. 8 is an exemplary diagram of a picture for executing an automatic sorting storage function.

And, FIG. 8 is an exemplary diagram of a picture for executing an automatic sorting storage function.

An example of storing still image files per group using EXIF information is explained with reference to FIG. 7 and FIG. 8 as follows.

First of all, a display apparatus is able to implement the embodiment shown in FIG. 7 and FIG. 8 and the aforesaid slide show jump function together or separately.

An OSD picture, as shown in FIG. 7, is outputted via the display unit. If a user selects additional information as a reference for an auto sorting storage function, the main controller 103 discriminates to store still image files grouped by the image location selecting unit 112 in the HDD 108 or the like.

For instance, if a user selects to input the additional information, which becomes the reference of the auto sorting storage function, as a photographing time (DateTime), the display apparatus generates folders per data, sorts the still image files, and then stores the sorted filed in the generated folders.

Figure 9:
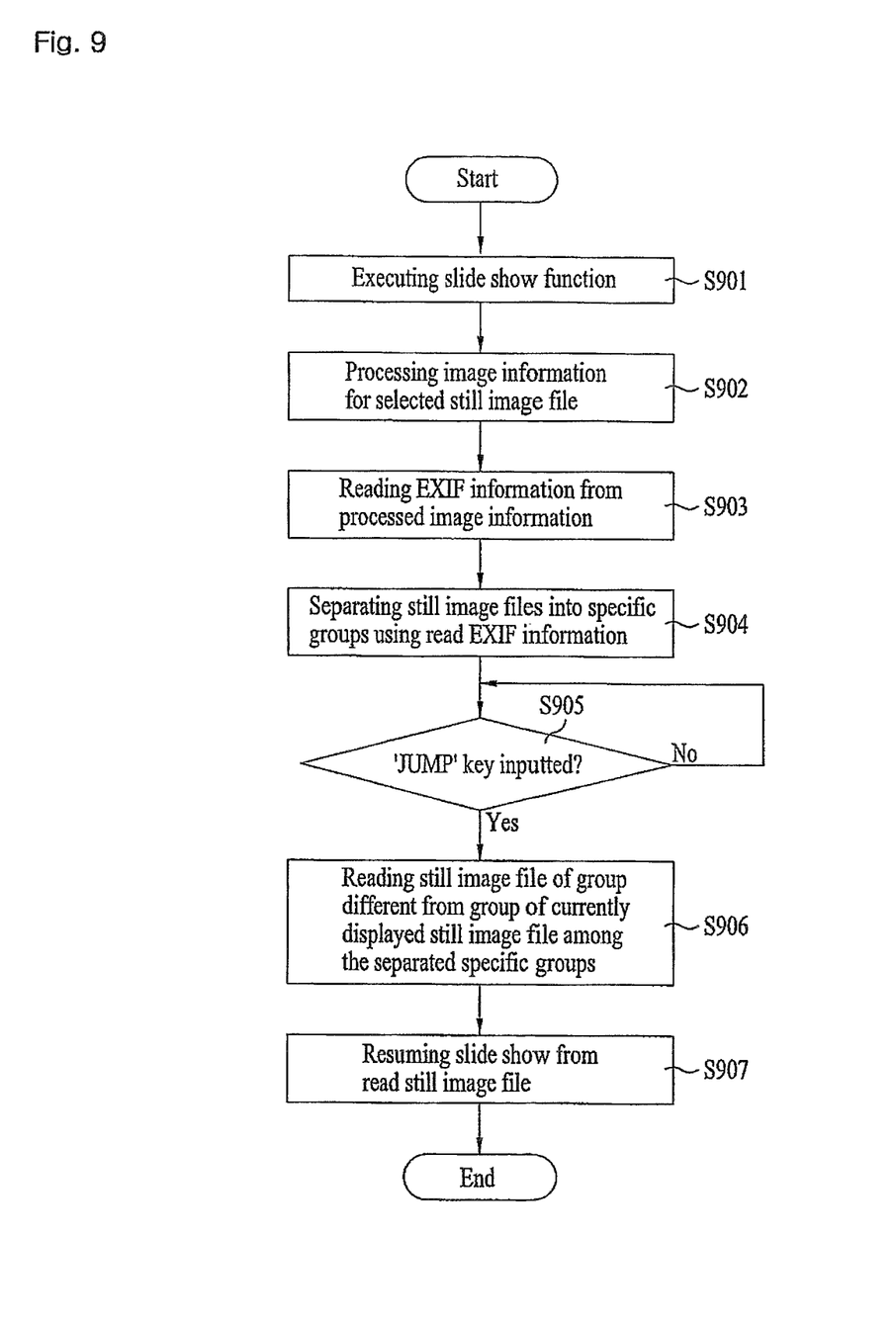
FIG. 9 is a flowchart of a method of controlling a display device having a slide show jump function according to the present invention.

FIG. 9 is a flowchart of a method of controlling a display device having a slide show jump function according to the present invention.

A method of controlling a display device having a slide show jump function according to the present invention is explained with reference to FIG. 9 as follows.

In the following description, since FIGS. 1 to 6 are explained in order of a time flow, details thereof are omitted.

First of all, a user executes a slide show function of the display apparatus (S901). In this case, the display apparatus includes a TV, a DTV, a PC, a mobile phone, or the like.

The display apparatus processes image information for at least one still image file to which the slide show function is applied (S902).

In this case, the at least one still image file includes at least one JPEG file photographed by a digital camera or the like for example.

The display apparatus reads additional information for the at least one still image file from the processed image information (S903).

In this case, the additional information for the at least one still image file can include EXIF information or the like.

The display apparatus sorts the at least one or more still image files into at least two groups using the read-out EXIF information (S904).

The display apparatus decides whether a 'JUMP' key input is applied thereto in the course of executing the slide show function (S905).

In this case, the 'JUMP' key can include a new button defined in a remote controller or use a conventional button.

As a result of the deciding step S905, if 'JUMP' key input is applied, the display apparatus reads the still image file of the group different from the former group, to which the still image file currently decoded and outputted to the screen belongs, from the sorted specific groups (S906).

Finally, the display apparatus decodes the read-in still image file and then resumes the slide show from the decoded still image file (S907).

INDUSTRIAL APPLICABILITY

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

First of all, a specific still image file of a group different from a former group to which a currently outputted still image picture belongs can be outputted in a simple way without searching for specific user-specific still image files one by one in the course of using a slide function.

Secondly, since still image files are automatically grouped and stored according to a specific reference, user' convenience and facilitation can be enhanced.

The invention claimed is:

1. A method of controlling a slide show function in a display device connected to at least one external device, comprising:

reading additional information from a selected external device, wherein the read additional information is data for at least one or more still image files to which the slide show function is applied;

grouping the at least one or more still image files into at least two main groups using the read additional information, wherein a first main group is grouped by date information and a second main group is grouped by Global Positioning System (GPS) information according to the read additional information, wherein the first main group is classified by at least two sub groups, and the second main group is classified by at least two sub groups;

selecting one of the sub groups;

displaying at least one or more still image file included in the selected sub group;

executing the slide show function with regard to the selected sub group;

receiving a specific key input to change from the selected sub group to the other sub group, wherein the other sub group is different from the selected sub group; and displaying at least one or more still image file included in the other sub group ongoing the slide show function without displaying the at least one or more still image file included in the selected sub group after received the specific key input during executing the slide show function with regard to the selected sub group, and wherein the selected sub group and the other sub group are included in the same main group.

2. The method of claim 1, wherein the at least one or more still image files comprise at least one or more JPEG (joint photographic expert group) files.

3. The method of claim 2, wherein the additional information comprises EXIF (exchangeable image file format) information.

4. The method of claim 1, further comprising:
storing the at least two main groups in a storage device.

5. A television having a slide show function, comprising:
a device selecting unit configured to select at least one external device connected to the television;
a reading unit configured to read additional information from the selected external device, wherein the read additional information is data for at least one or more still image files to which the slide show function is applied;
a selecting unit configured to group the at least one or more still image files into at least two main groups using the read additional information for the at least one or more still image files, wherein a first main group is grouped by date information and a second main group is grouped by Global Positioning System (GPS) information according to the read additional information, wherein the first main group is classified by at least two sub groups, and the second main group is classified by at least two sub groups; and
a control unit controlling to:
select one of the sub groups,
display at least one or more still image file included in the selected sub group,
execute the slide show function with regard to the selected sub group,
receive a specific key input to change from the selected sub group to the other sub group, wherein the other sub group is different from the selected sub group, and
display at least one or more still image file included in the other sub group ongoing the slide show function without displaying the at least one or more still image file included in the selected sub group after receiving the specific key input during executing the slide show function with regard to the selected sub group, and wherein the selected sub group and the other sub group are included in the same main group.

6. The television of claim 5, wherein the at least one or more still image files comprise at least one or more JPEG (joint photographic expert group) files.

7. The television of claim 5, wherein the additional information comprises EXIF (exchangeable image file format) information.

* * * * *